(12) United States Patent
Panicker et al.

(10) Patent No.: US 9,983,087 B2
(45) Date of Patent: May 29, 2018

(54) METHODS AND SYSTEMS TO DETERMINE ROTOR IMBALANCE

(71) Applicant: General Electric Company, Schenectady, NY (US)

(72) Inventors: Mahesh Raveendranatha Panicker, Bangalore (IN); Aninda Bhattacharya, Bangalore (IN); Akshay Krishnamurty Ambekar, Bangalore (IN); Bret Dwayne Worden, Union City, PA (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 490 days.

(21) Appl. No.: 14/565,981

(22) Filed: Dec. 10, 2014

(65) Prior Publication Data

US 2016/0169765 A1    Jun. 16, 2016

(51) Int. Cl.
*G01B 3/00* (2006.01)
*G01M 1/14* (2006.01)
*F01D 5/02* (2006.01)

(52) U.S. Cl.
CPC ............ *G01M 1/14* (2013.01); *F01D 5/027* (2013.01)

(58) Field of Classification Search
CPC .................. G01M 1/14; F01D 5/027
See application file for complete search history.

(56) References Cited

U.S. PATENT DOCUMENTS

| 3,554,061 | A |  | 1/1971 | Holdinghausen |
|---|---|---|---|---|
| 4,510,809 | A |  | 4/1985 | Fillion |
| 4,700,117 | A |  | 10/1987 | Giebeler et al. |
| 5,178,011 | A |  | 1/1993 | Ohms et al. |
| 5,406,846 | A |  | 4/1995 | Gasch et al. |
| 5,659,136 | A |  | 8/1997 | Koch et al. |
| 5,804,711 | A | * | 9/1998 | Remboski ............... G01M 15/11 73/114.05 |
| 5,841,025 | A | * | 11/1998 | Remboski ............... G01M 15/11 73/114.05 |
| 6,112,149 | A | * | 8/2000 | Varady ..................... F02B 75/22 123/406.24 |
| 6,305,211 | B1 |  | 10/2001 | Thelen et al. |
| 6,341,419 | B1 |  | 1/2002 | Forrester et al. |
| 6,885,932 | B2 | * | 4/2005 | Liu ......................... G01M 15/11 123/357 |
| 7,252,000 | B2 |  | 8/2007 | Care et al. |
| 7,756,649 | B2 |  | 7/2010 | Baehr et al. |
| 8,261,599 | B2 |  | 9/2012 | Jeffrey et al. |
| 8,672,625 | B2 |  | 3/2014 | Becker et al. |
| 2005/0218889 | A1 |  | 10/2005 | Yamada et al. |

(Continued)

OTHER PUBLICATIONS

Eurasian Search Report issued in connection with corresponding EA Application No. 201592117 dated Aug. 4, 2016.

(Continued)

*Primary Examiner* — Matthew G Marini

(74) *Attorney, Agent, or Firm* — Pabitra K. Chakrabarti

(57) ABSTRACT

A system is presented. The system includes a stator component, a rotor component rotating inside the stator component, a plurality of features disposed on the periphery of the stator component or the rotor component, and a processing subsystem for determining at least one of an amount of rotor imbalance and an orientation of the rotor imbalance at least based upon feature-to-feature speed variation of the plurality of features.

15 Claims, 7 Drawing Sheets

(56) References Cited

U.S. PATENT DOCUMENTS

2007/0283695 A1    12/2007  Figura
2008/0060434 A1     3/2008  Kershaw
2013/0067911 A1     3/2013  Worden et al.

OTHER PUBLICATIONS

Korkua S.K. et al.,"Power quality monitoring and control for DFIG wind generation", Power and Energy Society General Meeting, 2012 IEEE, IEEE, Jul. 22-26, 2012, 8 pages, Conference Location: San Diego, CA.

Wenxian Yang et al.,"Wind turbine condition monitoring and fault diagnosis using both mechanical and electrical signatures", Advanced Intelligent Mechatronics, 2008. AIM 2008. IEEE/ASME International Conference on, IEEE, Jul. 2-5, 2008, pp. 1296-1301, Conference Location: Xian.

Fengshou Gu et al.,"An investigation of the effects of measurement noise in the use of instantaneous angular speed for machine diagnosis", Mechanical Systems and Signal Processing, Science Direct, Aug. 2006, vol. 20, Issue: 6, pp. 1444-1460.

\* cited by examiner

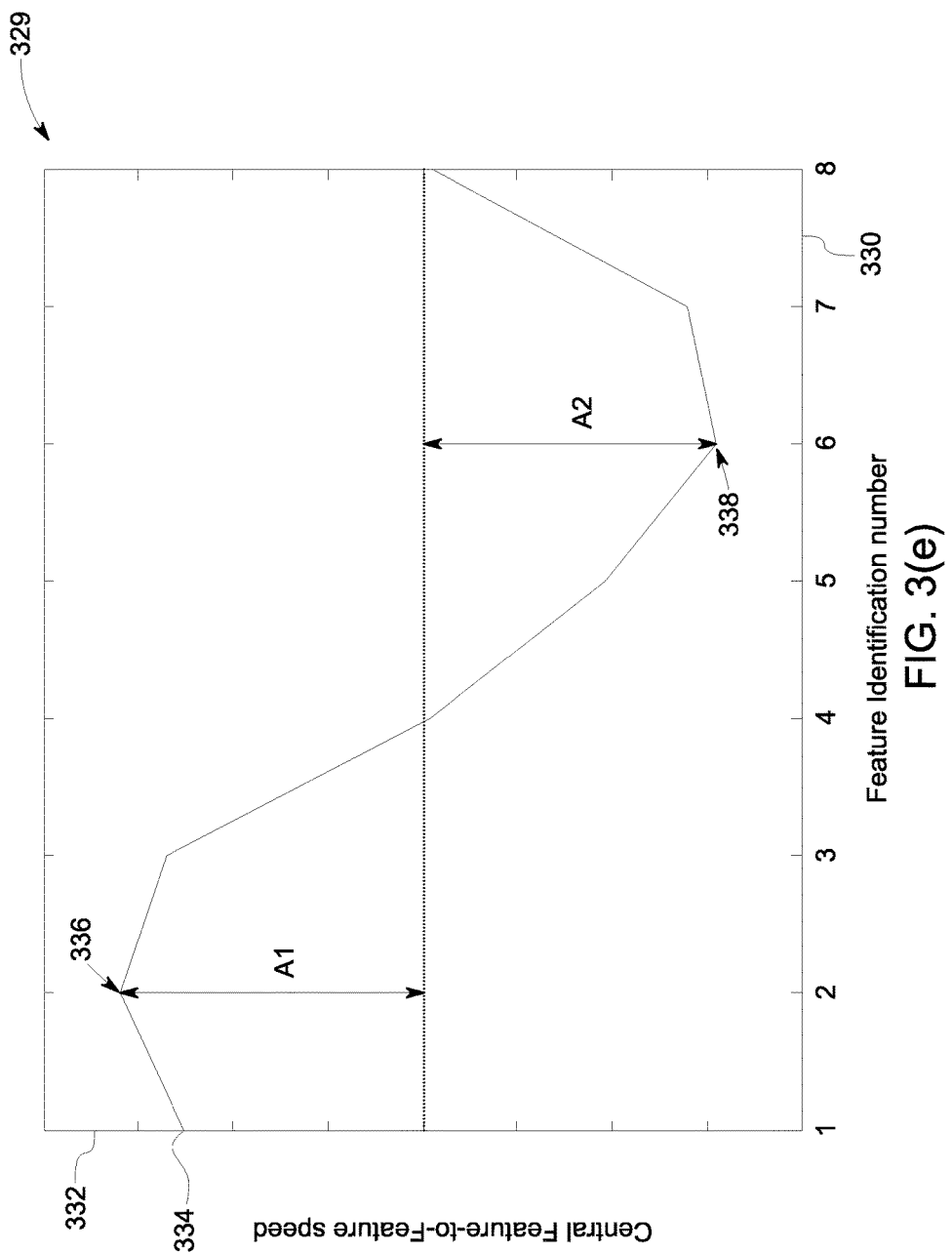

METHODS AND SYSTEMS TO DETERMINE ROTOR IMBALANCE

BACKGROUND

An engine system generally comprises a turbocharger. A turbocharger typically includes a compressor that is rotationally coupled to a turbine via a shaft. Typically when a turbocharger is used with a combustion engine, the turbine of the turbocharger is disposed in the path of exhaust gas exiting the combustion engine. The turbine includes a wheel (hereinafter: 'turbine wheel') that is rotated by the flow of the exhaust gas. The turbine wheel is rotatably coupled to a wheel (hereinafter: 'compressor wheel') of a compressor, in the turbocharger. The compressor is disposed in-line with an air-intake system of the combustion engine. Rotation of the turbine by the exhaust gas flow causes the compressor wheel to likewise rotate, wherein rotation of the compressor wheel acts to increase the mass flow of ambient air into an air intake system, and to increase pressure in the air intake system. One or more combustion cylinders in the combustion engine receive the fresh air from the air intake system and fuel from a fuel source to generate an air-fuel mixture. The combustion cylinders combust the air-fuel mixture to generate energy and exhaust gas. In some internal combustion engines, a portion of exhaust gas generated by the internal combustion engines is recirculated within the internal combustion engines to mix the portion of the exhaust gas and an air-fuel mixture resulting in generation of air-exhaust-gas-fuel mixture. Combustion cylinders in the internal combustion engines combust the air-exhaust-gas-fuel mixture to generate energy and the exhaust gas.

Turbochargers typically operate at high rotational speeds; the turbochargers may exceed 100,000 rpm. Additionally turbochargers operate in harsh and challenging conditions. The harsh and challenging conditions may result in imbalance in rotors. Imbalance in rotors is one of the main reasons for outage in internal combustion engines.

Therefore, it would be advantageous to provide improved systems and methods to determine presence of rotor imbalance, and identify the magnitude and location of the rotor imbalance.

BRIEF DESCRIPTION

In accordance with one embodiment, a system is presented. The system includes a stator component, a rotor component rotating inside the stator component, a plurality of features disposed on the periphery of the stator component or the rotor component, and a processing subsystem for determining at least one of an amount of rotor imbalance and an orientation of the rotor imbalance at least based upon feature-to-feature speed variation of the plurality of features.

In accordance with another embodiment, a method for determining at least an amount of rotor imbalance and an orientation of the rotor imbalance is presented. The method includes determining at least one of an amount of rotor imbalance and an orientation of the rotor imbalance at least based upon feature-to-feature speed variation of a plurality of features disposed on the periphery of a stator component or a rotor component rotating inside the stator component.

DRAWINGS

These and other features and aspects of embodiments of the present invention will become better understood when the following detailed description is read with reference to the accompanying drawings in which like characters represent like parts throughout the drawings, wherein:

FIG. 3($b$) is an experimental plot of feature-to-feature speed determined using times of arrival of features;

FIG. 3($c$) is an experimental plot of stacked feature-to-feature speed of features;

FIG. 3($d$) is a graphical representation of central-feature-to-feature speed of a plurality of features; and FIG. 3($e$) is a plot of feature-to-feature speed variation of a plurality of features.

DETAILED DESCRIPTION

A rotor in a rotating machine may have a mass imbalance or a load imbalance. For example, a rotor may have mass imbalance when a center of mass of a rotor is not in line with an axis of rotation of the rotor. For example, a rotor may have load imbalance due to misfiring in cylinders of an internal combustion engine. The present systems and methods, described in detail hereinafter, detects imbalance in rotors. Furthermore, the present systems and methods determine an amount and orientation of the imbalance in the rotors. The present systems and methods determine the presence, amount and orientation of the imbalance based on rotor speed, therefore does not require installation of additional components. The present systems and methods described herein may be employed in a variety of machines, devices, engines, turbines, turbochargers, or the like that employ rotors.

Figure 1:
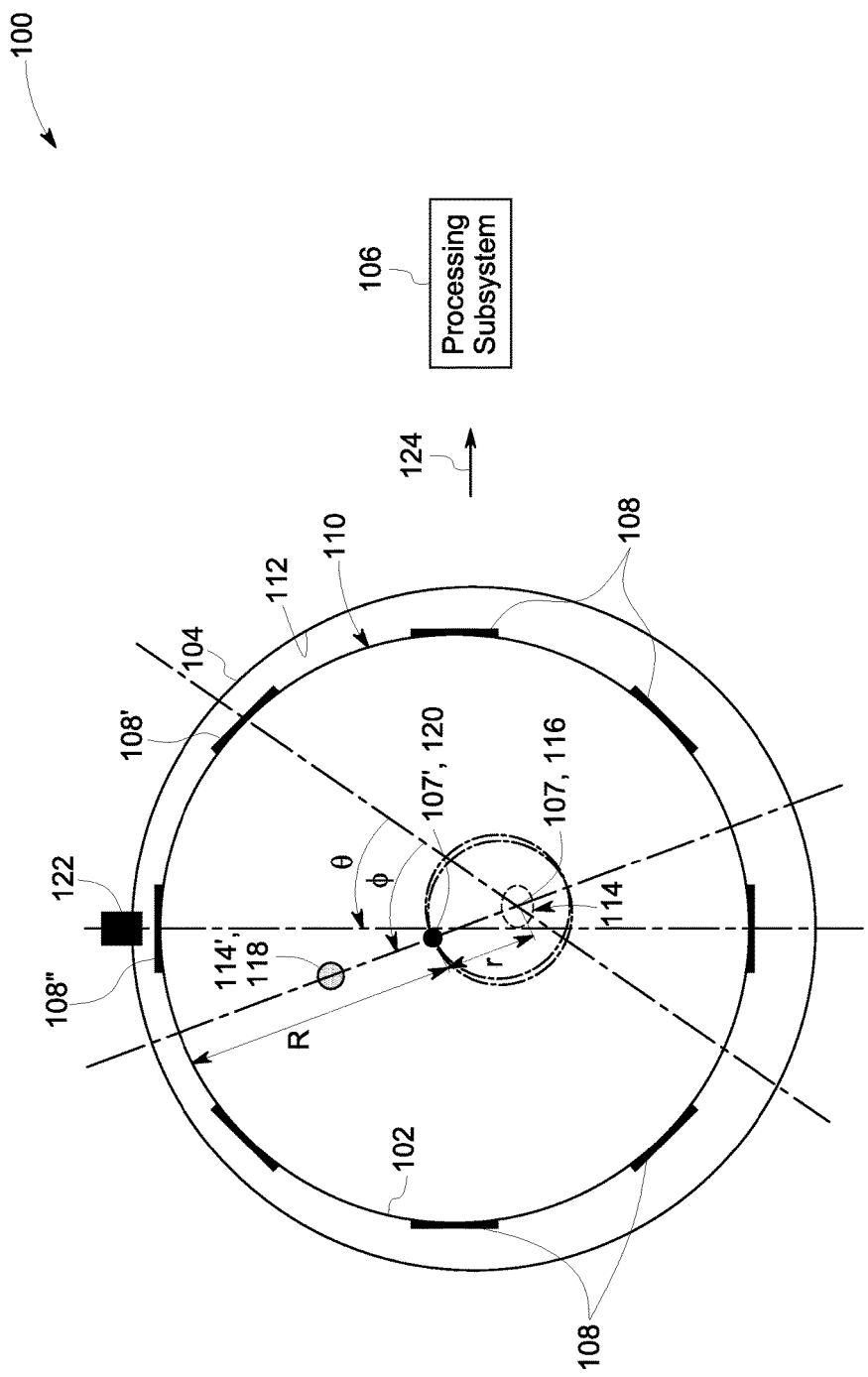
FIG. 1 is a block diagram of a system for determining imbalance in a rotor component, in accordance with certain embodiments of the present techniques.

Referring now to FIG. 1, a block diagram of a system 100 for determining imbalance in a rotor component 102 (hereinafter 'rotor 102') is shown, in accordance with certain embodiments of the present techniques. The system 100 includes the rotor 102, a stator component 104 (hereinafter 'stator 104'), and a processing subsystem 106. In the presently contemplated configuration, the rotor 102 is characterized by a radius R. For ease of understanding, the stator 104 and rotor 102 are not depicted as a part of a device, such as, a compressor, a turbine or a turbocharger, or the like. However, it is noted that the rotor 102 may be a component of a device (not shown). As shown in FIG. 1, the rotor 102 is located inside the stator 104, and therefore is surrounded by the stator 104. A plurality of features 108 are disposed/located on the periphery of the rotor 102 and/or the stator 104. For example, the features 108 are disposed or located on an outer surface 110 or an inner surface 112 of the stator 104. In the presently contemplated configuration, the features 108 are located on the outer surface 110 of the rotor 102. The features 108, for example, may include teeth, depressions, markings, or combinations thereof. In the presently contemplated configuration, the features 108 are teeth. In one embodiment, the features 108 are evenly distributed on the outer surface 110. In the presently contemplated configuration, the features 108 include a reference feature 108', and an $i^{th}$ feature 108" that is being monitored by a sensor 122 at a time stamp t to generate respective data. As used herein, the term "reference feature" is used to refer to a feature having a position/location which is directly or indirectly used to determine an orientation (φ) of a rotor imbalance.

With operation, the rotor 102 may develop an imbalance including a mass imbalance or a load imbalance. If the rotor 102 were not imbalanced, then in the presently contemplated configuration, a center 114 of mass of the rotor 102 and an axis of rotation 107 of the rotor 102 would have coincided at a respective endurable position 116. However, in the presently contemplated configuration, the rotor 102 has a mass imbalance as the center 114 of mass of the rotor 102 has shifted from the respective endurable position 116 to unendurable position 118. For ease of understanding, the shifted center 114 at the unendurable position 118 shall hereinafter be referred to by the reference numeral 114'. The rotor/mass imbalance results in a radial deflection (r) of the rotor 102, resulting in movement of the axis of rotation 107 from the position 116 to a position 120. For ease of understanding and simplicity in referring to the drawings, the shifted axis of rotation 107 at the position 120 is shown by reference numeral 107'. As used herein, the phrase "endurable position" refers to a position of the center 114 of mass of the rotor 102 that is in line with the axis 107 of rotation, or another position of the center 114 of mass that is not in-line with the center 114 of mass, but a distance between the another position and the axis 107 of rotation is within a tolerable range that does not result in defects or propagation of defects. As used herein, the phrase "unendurable position" refers to a position of the center 114 of mass of the rotor 102 that is not in-line with the axis 107 of rotation, and a distance between a position of the center 114 of mass and the axis 107 of rotation is within an intolerable range resulting in defects or propagation of defects.

The system 100 further includes the at least one sensing device 122 that generates signal representative of times of arrival 124 of the features 108. A signal representative of the times of arrival 124 of the features 108 is shown with reference to FIG. 3(a). In the presently contemplated configuration, at a time stamp t, the sensing device 122 is shown to monitor the $i^{th}$ feature 108'' to generate signals representative of a times of arrival of the $i^{th}$ feature 108''. The processing subsystem 106 receives the times of arrival 124 of the features 108 from the sensing device 122. The processing subsystem 106 determines a plurality of feature-to-feature speed of the features 108 based upon the times of arrival 124 corresponding to features 108 and an angular distance of the plurality of features from adjacent feature in the plurality of features. For example, the feature-to-feature speed of the features 108 may be determined using the following equation (1):

$$\text{Feature-to-feature speed} = \frac{\theta}{TOA_{fi} - TOA_{fi+1}} \quad (1)$$

wherein $TOA_{fi}$ is a time of arrival of an $i^{th}$ feature, $TOA_{fi+1}$ is a time of arrival of an $(i+1)^{th}$ feature, and θ is angular distance between a feature $f_i$ and an adjacent feature $f_{i+1}$. For example, in the presently contemplated configuration, a feature-to-feature speed of the $i^{th}$ feature 108'' may be determined based on an angular distance between the $i^{th}$ feature 108'' and an adjacent feature 108', a time of arrival of the $i^{th}$ feature 108' and a time of arrival of the adjacent feature 108'. It is noted that while in the presently contemplated configuration, the feature 108' is adjacent feature for the $i^{th}$ feature 108'' and also a reference feature, however an adjacent feature may not be the reference feature 108'.

Subsequent to the determination of the feature-to-feature speed, the processing subsystem 106 determines feature-to-feature speed variation of the features 108 based on the feature-to-feature speed of the features 108. The determination of the feature-to-feature speed variation is explained in greater detail with reference to FIG. 2 and FIG. 3(a)-FIG. 3(e). The processing subsystem 106 further determines at least one of an amount of rotor imbalance and an orientation of the rotor imbalance based on the feature-to-feature speed variation. The determination of the amount of rotor imbalance and the orientation of the rotor imbalance shall be explained in greater detail with reference to FIG. 2 and FIG. 3(a)-FIG. 3(e). In one embodiment, processing subsystem 106 also determines and controls the weights that need to be applied to the rotor to reduce the rotor imbalance. The value of weights is determined based on the orientation and the amount of rotor imbalance determined by processing subsystem 106. In another embodiment, processing subsystem 106 may include software, hardware, or firmware elements, or any combination of these elements.

Figure 2:
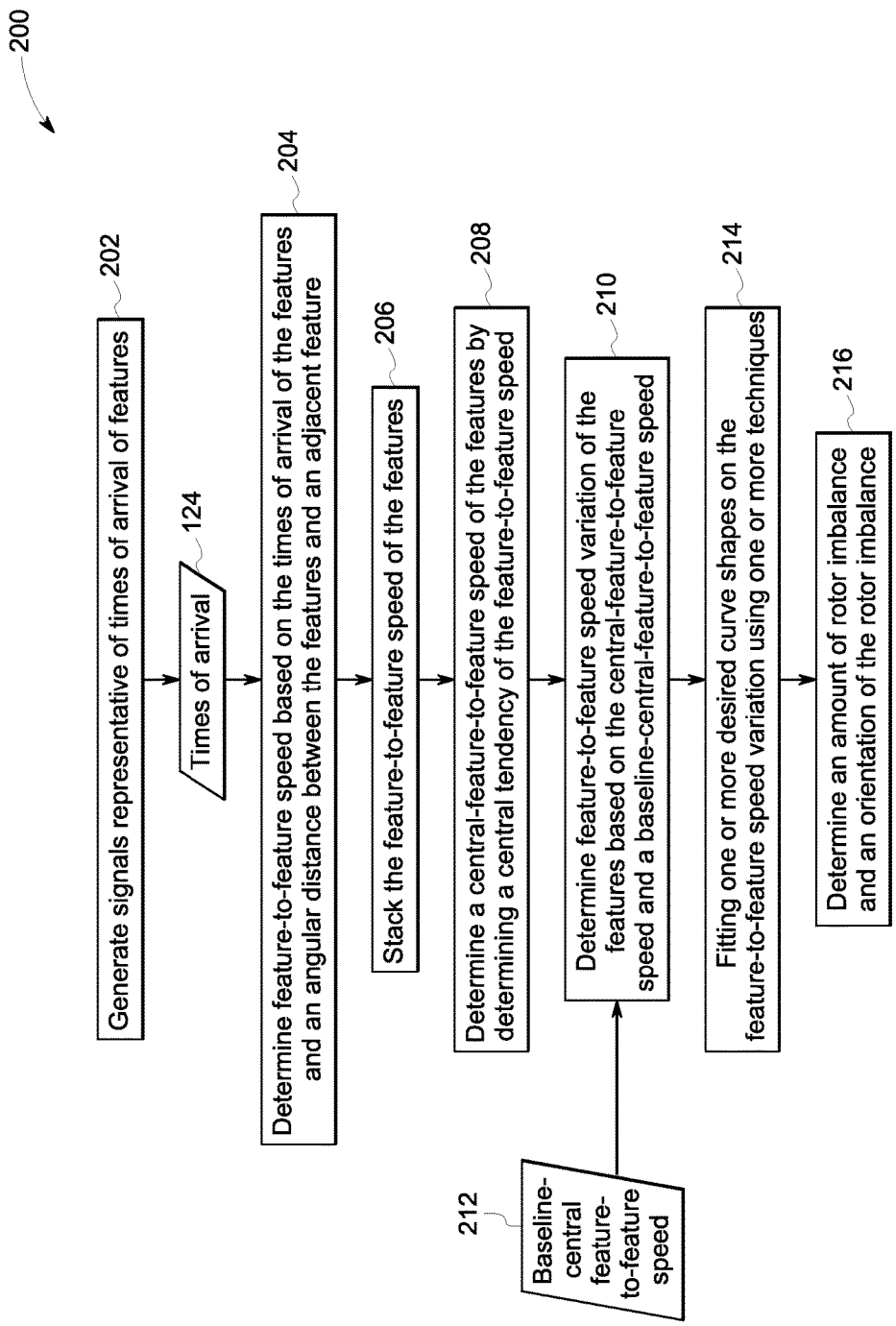
FIG. 2 is a flow chart for determining imbalance in a rotor component, in accordance with one embodiment of the present techniques.

FIG. 2 is a flow chart illustrating a method 200 for determining imbalance in the rotor 102 referred to in FIG. 1, in accordance with certain embodiments of the present techniques. The blocks of FIG. 2, for example, may be executed by the processing subsystem 106. At block 202, the signals representative of the times of arrival 124 of the features 108 are generated. During operation of the rotor 102, the signals representative of the times of arrival 124 are generated by the sensing device 122 (see FIG. 1). In one embodiment, the sensing device 122 generates the signals representative of the times of arrival 124 corresponding to each of the features 108. A plot of signals representative of times of arrival of features is shown with reference to FIG. 3(a).

At block 204, feature-to-feature speed of the features 108 may be determined based on the times of arrival 124 of the features 108 and an angular distance between the features 108 and an adjacent feature in the features 108. For example, the feature-to-feature speed may be determined using equation (1). For example, a feature-to-feature speed of a first feature in the features 108 may be determined using the following equation:

$$\text{Feature-to-feature } speed_{1st\ feature} = \frac{\theta_{1st\ feature\ and\ 2nd\ feature}}{TOA_{1st\ feature} - TOA_{2nd\ feature}} \quad (2)$$

$\theta_{1st\ feature\ and\ 2nd\ feature}$ is angular distance between the first feature and a second feature that is adjacent to the first feature, $TOA_{1st\ feature}$ is a time of arrival of a first feature, $TOA_{2nd\ feature}$ is time of arrival of a second feature that is adjacent to the first feature. A plot of feature-to-feature speed is shown with reference to FIG. 3(b).

At block 206, feature-to-feature speed of the features 108 are stacked, such that multiple feature-to-feature speed of each feature over multiple rotations are stacked together. For example, feature-to-feature speed of a first feature are stacked for n rotations of the rotor 102 may be stacked together. Similarly, multiple feature-to-feature speed of a second feature for the n rotations of the rotor 102 may stacked together. Stacked feature-to-feature speed of features is shown with reference to FIG. 3(c).

Furthermore, at block 208, a central-feature-to-feature speed of the features 108 is determined by determining a central tendency of the feature-to-feature speed of the features. The central tendency, for example, may be determined by determining a median, average or mode of feature-to-feature speed of each feature in the features 108. A plot of the central-feature-to-feature speed is shown with reference to FIG. 3(*d*).

At block 210, feature-to-feature speed variation of the features 108 is determined based on the central-feature-to-feature speed and a baseline-central-feature-to-feature speed 212 of the features 108. The feature-to-feature speed variation of the features 108, for example, may be determined by subtracting a respective central-feature-to-feature speed from a respective baseline-central-feature-to-feature speed of each of the features 108. As used herein, the phrase "baseline-central-feature-to-feature speed" refers to a central-feature-to-feature speed of a feature when either the rotor 102 does not have an imbalance or the rotor 102 has an endurable imbalance which does not result in defects or propagation of defects.

At block 214, one or more desired curve shapes (hereinafter referred to as "desired curve of feature-to-feature speed variation") may be fitted on the feature-to-feature speed variation using one or more techniques. The one or more techniques, for example include a regression technique, Curve fitting techniques, Optimization techniques, higher order polynomial fit, wavelet based fit, Empirical Mode Decomposition, or the like. In one embodiment, when the rotor 102 comprises mass imbalance, then the desired curve of the feature-to-feature speed variation includes a single sinusoidal curve. An example of a sinusoidal curve that shows mass imbalance in a rotor is shown with reference to FIG. 3(*e*). In another embodiment, when the rotor 102 has load imbalance (e.g. due to misfiring in cylinders of an internal combustion engine), then the desired curve shape of the feature-to-feature speed variation may include one or more sinusoidal curves or peaks.

Furthermore, at block 216, an amount of rotor imbalance and an orientation of the rotor imbalance in the rotor 102 may be determined. The amount of rotor imbalance, for example, may be determined based upon feature-to-feature speed variation of the plurality of features. For example, the amount of rotor imbalance may be determined based on one or more amplitudes of the desired curve shapes of the feature-to-feature speed variation. For example, the amount of the rotor imbalance may be determined based on a natural frequency of the rotor 102, mass of the rotor 102, a corresponding speed of the rotor 102, the one or more amplitudes of the desired curve shapes of the feature-to-feature speed variation, or combinations thereof. An amount of rotor imbalance, for example, may be determined based on the following equation (3):

$$\text{Amount of rotor imbalance} = M^{*}e \quad (3)$$

wherein e is eccentricity of the rotor 102, and M is mass of the rotor 102. The eccentricity of the rotor 102, for example, may be determined using the following equation (4)

$$e = r \frac{\omega_n^2 - \omega^2}{\omega^2} \quad (4)$$

wherein $\omega_n$ is natural frequency of the rotor 102, e is eccentricity or an amount of rotor imbalance, $\omega$ is average rotor speed in a time period T for which data is generated to determine orientation and imbalance in the rotor 102, and r is a radial deflection of a center of mass. The radial deflection r of the center of mass, for example, may be determined by solving the following equation (5):

$$\frac{R \delta \omega_i}{\omega} = r\cos(\phi - \theta_i) \quad (5)$$

wherein i=1, 2, 3 N, $\delta \omega_i$ is feature-to-feature speed variation of $i^{th}$ feature, i is feature identification number, $\theta_i$ is an angular distance of the $i^{th}$ feature from adjacent feature, $\omega$ is average rotor speed in a time period T for which data is generated to determine orientation and imbalance in the rotor 102, R is radius of the rotor 102, $\phi$ is orientation of the rotor imbalance, N is total number of features.

In one embodiment, an orientation of the rotor imbalance in the rotor 102 is determined based on a phase shift in the central-feature-to-feature speed (determined at block 208) with respect to the baseline-central-feature-to-feature speed-variation. In another embodiment, the orientation of the rotor imbalance in the rotor 102 may be determined as follows:

a.) identify a maximum feature-to-feature speed variation value and a minimum feature-to-feature speed variation value in the in the desired curve of the feature-to-feature speed variation;

b) identify a first feature identification number corresponding to the maximum feature-to-feature speed variation value and a second feature identification number corresponding to the minimum feature-to-feature speed variation value; and c) determine the orientation of the rotor imbalance in the rotor 102 around the first feature identification number and the second feature identification number. The determination of the rotor imbalance, for example may be determined by solving the equations.

FIG. 3(*a*) is an experimental plot 302 of signals 304 representative of times of arrival of a plurality of features located on a rotor. The signals 304, for example, may be the signals representative of the times of arrival 124 of the features 108 generated by the sensing device 122 at block 202 in FIG. 2. The signals 304, for example, are electrical voltage signals. X-axis 306 of the plot 302 represents times of arrival in seconds and Y-axis 308 represents amplitude of the signals in voltage. For example, the signals are generated corresponding to each of the features 108 (see FIG. 1). In the presently contemplated configuration, the signals 304 correspond to eight features. For example, peak 301 represents a time of arrival of a first feature in a first rotation of the rotor, peak 303 represents time of arrival of a second feature in the first rotation of the rotor, intermediate peaks 305 represent times of arrival of third to seventh features in the first rotation of the rotor, and peak 307 represents time of arrival of eighth feature in the first rotation of the rotor. Subsequent to the time of arrival of the eighth feature represented by the peak 305, subsequent peaks represent times of arrival of the features in subsequent rotations. In the presently contemplated configuration a portion of the signals 304 is shown due to space constraints.

FIG. 3(*b*) is an experimental plot 310 of feature-to-feature speed determined using the signals 304 representative of the times of arrival in plot 302 in FIG. 3(*a*). X-axis 312 of the plot 310 represents times of arrival of the features, and Y-axis 314 of the plot 310 represents feature-to-feature speed of the features. For example, a peak 315 in the plot 310 represents a feature-to-feature speed of the first feature in the eight features. For example, the feature-to-feature speed 315 may be determined based on the time of arrival of the first feature represented by the peak 301 (see FIG. 3(a)), the time of arrival of the second feature represented by the peak 303 (see FIG. 3(a)) and an angular distance between the first feature and the second feature. For example, the feature-to-feature speed may be determined using the equation (1).

Figure 3A:
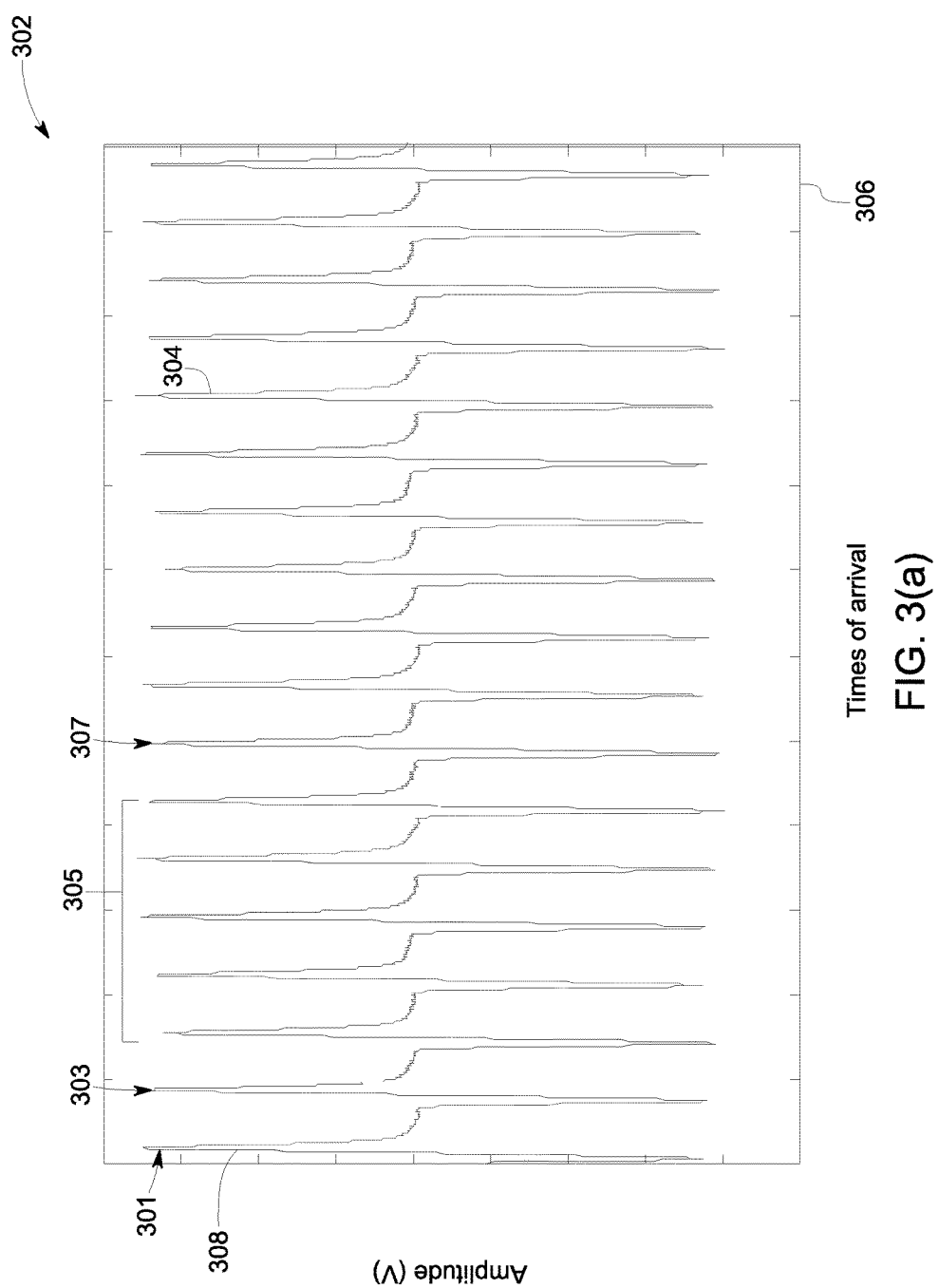
FIG. 3($a$) is an experimental plot of signals representative of times of arrival of a plurality of features.
Figure 3B:
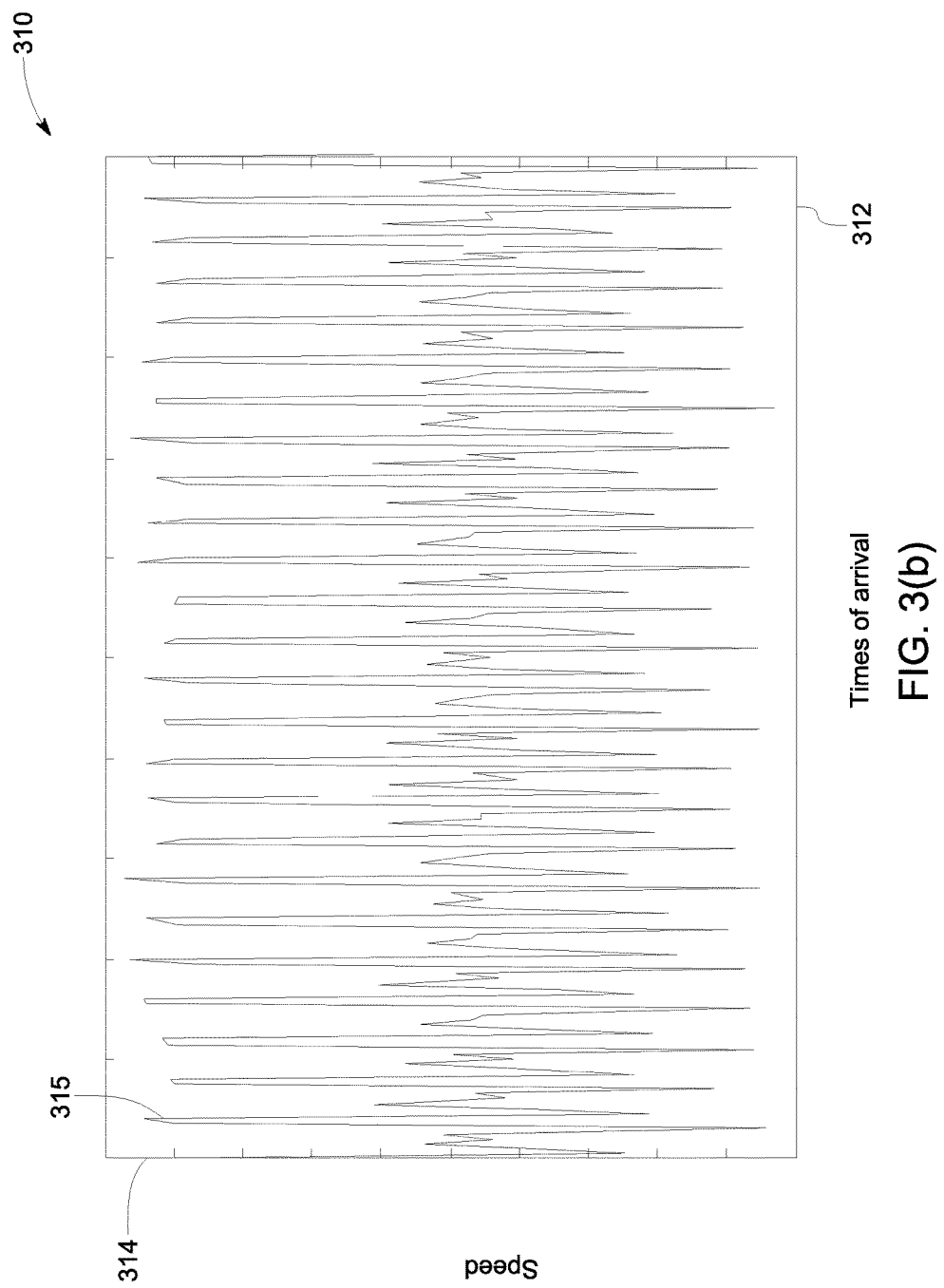
Figure 3C:
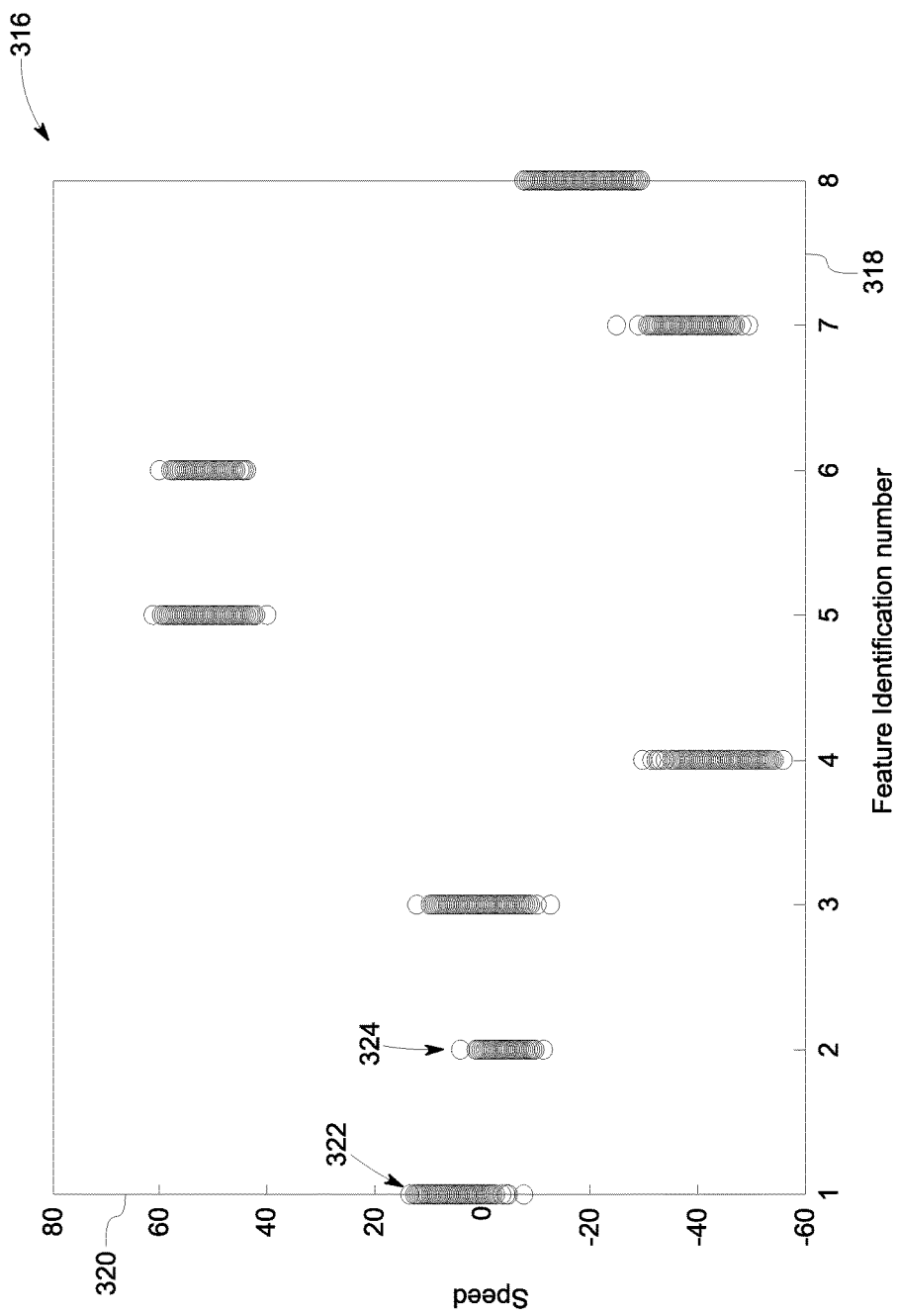

FIG. 3(c) is an experimental plot 316 of stacked feature-to-feature speed of the eight features referred to in FIG. 3(a). X-axis 318 represents feature identification number, and Y-axis 320 represents feature-to-feature speed. In FIG. 3(c) feature-to-feature speed determined in the plot 310 of FIG. 3(b) are stacked together to map to a respective feature. For example, reference numeral 322 represents multiple feature-to-feature speed of the first feature that are stacked together to map to the first feature. Similarly reference numeral 324 represents multiple feature-to-feature speed of the second feature that are stacked together to map to the second feature.

Figure 3D:
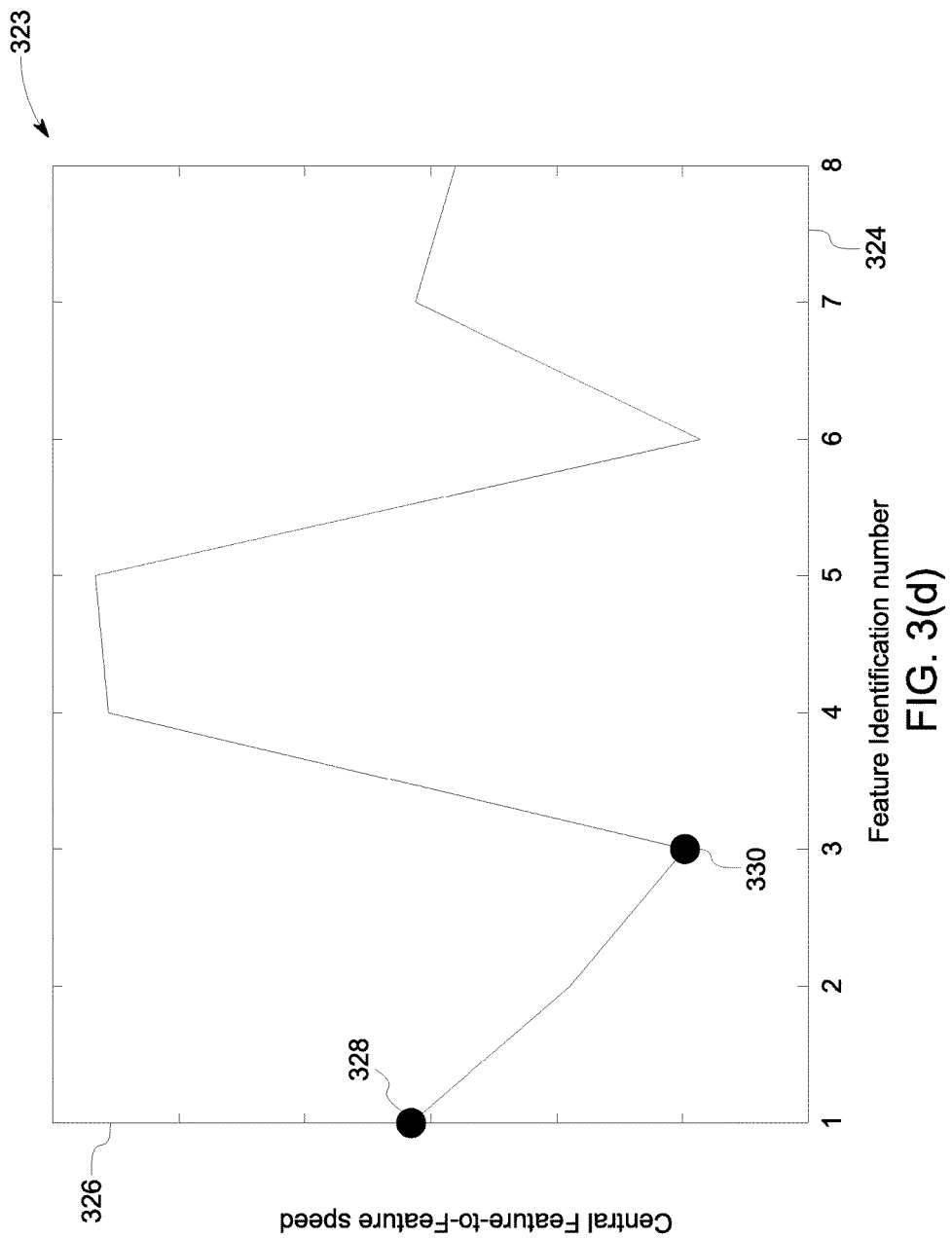

FIG. 3(d) is a plot 323 of central-feature-to-feature speed of the eight features referred to in FIG. 3(a). X-axis 324 represents feature identification number and Y-axis 326 represents central-feature-to-feature speed. The central-feature-to-feature speed, for example is determined by determining a central tendency of the feature-to-feature speed of the features. For example, a central-feature-to-feature speed 328 of the first feature is determined by determining a median of the feature-to-feature speeds 322 shown in FIG. 3(c). Similarly, a central-feature-to-feature speed 330 of the second feature may be determined by determining a median of the feature-to-feature speed 324 of the second feature. In one embodiment, the orientation of the rotor imbalance in the rotor 102 may be determined based on a phase shift between the central-feature-to-feature speed and the baseline-central-feature-to-feature speed 212 referred to in FIG. 2. The orientation of the rotor imbalance, for example, may be determined using the equation (5).

FIG. 3(e) is a plot 329 of feature-to-feature speed variation of the eight features referred to in FIG. 3(a) and FIG. 3(d). Furthermore, FIG. 3(e) shows a desired curve of the feature-to-feature speed variation that is generated by fitting a desired curve on the feature-to-feature speed variation. X-axis 330 represents feature identification number and Y-axis 332 represents feature-to-feature speed variation. For example, the plot 329 is determined by subtracting the plot 323 representing central-feature-to-feature speed from the baseline-central-feature-to-feature speed 212 referred to in FIG. 2. In one embodiment, the feature-to-feature speed variation corresponding to each of the eight features may be determined by subtracting a respective central-feature-to-feature speed of a feature from a respective baseline-central-feature-to-feature speed of the feature. For example, in the present plot 329, reference numeral 334 represents a feature-to-feature speed variation of the first feature, and a reference numeral 336 represents a feature-to-feature speed variation of the second feature, and reference numeral 338 represents a feature-to-feature speed variation of sixth feature. In the present plot 329, the feature-to-feature speed variation 336 of the second feature is characterized by a maximum amplitude value (hereinafter "maximum feature-to-feature speed variation value") and the feature-to-feature speed variation 338 of the sixth feature is characterized by a minimum amplitude value (hereinafter "minimum feature-to-feature speed variation value"). An amount of rotor imbalance, for example may be determined based on the maximum feature-to-feature speed variation value and the minimum feature-to-feature speed variation value using equations (3)-(5).

Furthermore, since the maximum feature-to-feature speed variation value corresponds to the second feature and the minimum feature-to-feature speed variation value corresponds to the sixth feature, therefore, in the presently contemplated configuration, the orientation of the rotor imbalance may be determined around the second feature and the sixth feature.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system, comprising:
a stator component;
a rotor component rotating inside the stator component;
a plurality of features disposed on the periphery of the stator component or the rotor component;
a processing subsystem for:
   determining a rotor imbalance at least based upon a feature-to-feature speed variation of the plurality of features, wherein the feature-to-feature speed variation is a function of a central-feature-to-feature speed and a plurality of baseline-central-feature-to-feature speeds of the plurality of features; and
   determining an orientation of the rotor imbalance by:
      identifying a maximum feature-to-feature speed variation value and a minimum feature-to-feature speed variation value in one or more desired curves of the feature-to-feature speed variation;
      identifying a first feature identification number corresponding to the maximum feature-to-feature speed variation value and a second feature identification number corresponding to the minimum feature-to-feature speed variation value; and
      determining the orientation of the rotor imbalance around the first feature identification number and the second feature identification number.

2. The system of claim 1, wherein the rotor imbalance comprises load imbalance, mass imbalance, or a combination thereof.

3. The system of claim 1, wherein the plurality of features comprises teeth, depressions, markings, or combinations thereof.

4. The system of claim 2, further comprising at least one sensing device that generates signals representative of times of arrival of the plurality of features.

5. The system of claim 4, wherein the processing subsystem determines the plurality of feature-to-feature speeds of the plurality of features based upon the times of arrival corresponding to the plurality of features and an angular distance of the plurality of features from adjacent feature in the plurality of features.

6. The system of claim 5, wherein the processing subsystem further determines an amount of the rotor imbalance based upon the feature-to-feature speed variation by:
   determining the central-feature-to-feature speed of the plurality of features by determining a central tendency of the plurality of feature-to-feature speeds;
   determining the feature-to-feature speed variation based upon the central-feature-to-feature speed and the plurality of baseline-central-feature-to-feature speeds of the plurality of features;
   generating the one or more desired curves of the feature-to-feature speed variation by fitting one or more desired curve shapes on the feature-to-feature speed variation using one or more techniques; and determining the amount of rotor imbalance based upon one or more amplitudes of the one or more desired curves of the feature-to-feature speed variation.

7. The system of claim 6, wherein the processing subsystem fits the one or more desired curve shapes on the feature-to-feature speed variation using at least one technique comprising a regression technique, Curve fitting techniques, Optimization techniques, Higher order polynomial fit, wavelet based fit, and Empirical Mode Decomposition.

8. The system of claim 7, wherein the one or more desired curves comprise a single sinusoidal curve when the rotor imbalance comprises the mass imbalance, and the one or more desired curves comprise one or more sinusoidal curves or peaks when the rotor imbalance comprises load imbalance in an internal combustion engine.

9. The system of claim 8, wherein a number of the one or more sinusoidal curves or peaks is dependent on a number of cylinders, in an internal combustion engine, comprising defects.

10. The system of claim 6, wherein the processing subsystem further determines the amount of the rotor imbalance based upon the one or more amplitudes of the one or more desired curves of the feature-to-feature speed variation, a natural frequency of the rotor component, a corresponding speed of the rotor component, or combinations thereof.

11. The system of claim 6, wherein the processing subsystem further determines the orientation of the rotor imbalance based upon a phase shift in the central-feature-to-feature speed with respect to the baseline-central-feature-to-feature speeds of the plurality of features.

12. A method, comprising:
determining a rotor imbalance at least based upon feature-to-feature speed variation of a plurality of features disposed on the periphery of a stator component or a rotor component rotating inside the stator component, wherein the feature-to-feature speed variation is a function of a central-feature-to-feature speed and a plurality of baseline-central-feature-to-feature speeds of the plurality of features;
determining an orientation of the rotor imbalance by:
identifying a maximum feature-to-feature speed variation value and a minimum feature-to-feature speed variation value in one or more desired curves of the feature-to-feature speed variation;
identifying a first feature identification number corresponding to the maximum feature-to-feature speed variation value and a second feature identification number corresponding to the minimum feature-to-feature speed variation value; and
determining the orientation of the rotor imbalance around the first feature identification number and the second feature identification number.

13. The method of claim 12, further comprising:
generating signals representative of times of arrival of the plurality of features; and
determining a plurality of feature-to-feature speed of the plurality of features based upon the times of arrival of the plurality of features and an angular distance of the plurality of features from adjacent feature in the plurality of features.

14. The method of claim 13, further comprising determining an amount of the rotor imbalance based upon the feature-to-feature speed variation of the plurality of features comprises:
determining the central-feature-to-feature-speed of the plurality of features by determining a central tendency of the plurality of feature-to-feature speed;
determining the feature-to-feature speed variation based upon the central-feature-to-feature-speed and the plurality of baseline-central-feature-to-feature speeds of the plurality of features;
fitting one or more desired curve shapes on the feature-to-feature speed variation using one or more techniques; and
determining the amount of the rotor imbalance based upon one or more amplitudes of the one or more desired curves.

15. The method of claim 13, wherein determining the orientation of the rotor imbalance comprises:
determining the orientation of the rotor imbalance based upon a phase shift in the feature-to-feature speed of the plurality of features with respect to the plurality of baseline-central-feature-to-feature speeds of the plurality of features.

* * * * *